(12) United States Patent
Sasaki et al.

(10) Patent No.: US 7,759,403 B2
(45) Date of Patent: Jul. 20, 2010

(54) FLEXIBLE POLYURETHANE FOAM, PROCESS FOR ITS PRODUCTION, AND SEAT FOR AUTOMOBILE USING THE FLEXIBLE POLYURETHANE FOAM

(75) Inventors: Takayuki Sasaki, Kamisu (JP); Takashi Ito, Kamisu (JP); Chitoshi Suzuki, Kamisu (JP); Tomohiro Hayashi, Kamisu (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/944,665

(22) Filed: Nov. 26, 2007

(65) Prior Publication Data

US 2008/0176970 A1 Jul. 24, 2008

Related U.S. Application Data

(63) Continuation of application No. PCT/JP2006/309499, filed on May 11, 2006.

(30) Foreign Application Priority Data

May 25, 2005 (JP) ............................. 2005-153103

(51) Int. Cl.
*C08G 18/28* (2006.01)
(52) U.S. Cl. .................. 521/138; 521/130; 521/131; 521/133; 521/134; 521/137; 521/174
(58) Field of Classification Search ................ 521/130, 521/131, 133, 134, 137, 138, 174
See application file for complete search history.

(56) References Cited

U.S. PATENT DOCUMENTS

| | | | |
|---|---|---|---|
| 5,916,994 A * | 6/1999 | Izukawa et al. ............... 528/66 |
| 6,653,362 B2 | 11/2003 | Toyota et al. |
| 6,734,219 B2 | 5/2004 | Wada et al. |
| 6,756,415 B2 | 6/2004 | Kimura et al. |
| 6,759,448 B2 | 7/2004 | Toyota et al. |
| 6,815,467 B2 | 11/2004 | Toyota et al. |
| 2003/0109594 A1 | 6/2003 | Wada et al. |
| 2004/0152797 A1 | 8/2004 | Wada et al. |
| 2004/0229970 A1 | 11/2004 | Sasaki et al. |
| 2005/0065310 A1* | 3/2005 | Wang et al. .................. 528/44 |
| 2006/0160912 A1 | 7/2006 | Sasaki et al. |
| 2006/0160913 A1 | 7/2006 | Sasaki et al. |
| 2006/0205834 A1 | 9/2006 | Sasaki et al. |
| 2007/0213420 A1 | 9/2007 | Kimura et al. |
| 2007/0219284 A1 | 9/2007 | Sasaki et al. |

FOREIGN PATENT DOCUMENTS

| | | |
|---|---|---|
| JP | 11-310619 | 11/1999 |
| JP | 2002-80505 | 3/2002 |
| JP | 2002-265555 | 9/2002 |
| JP | 2002-308909 | 10/2002 |
| JP | 2003-226734 | 8/2003 |
| JP | 2005-120247 | 5/2005 |
| JP | 2005-179653 | 7/2005 |

OTHER PUBLICATIONS

U.S. Appl. No. 11/876,237, filed Oct. 22, 2007, Sasaki, et al.
U.S. Appl. No. 11/944,002, filed Nov. 21, 2007, Sasaki, et al.
U.S. Appl. No. 11/944,730, filed Nov. 26, 2007, Sasaki, et al.
U.S. Appl. No. 11/944,799, filed Nov. 26, 2007, Sasaki, et al.
U.S. Appl. No. 12/200,145, filed Aug. 28, 2008, Sasaki, et al.
U.S. Appl. No. 12/210,509, filed Sep. 15, 2008, Sasaki, et al.
U.S. Appl. No. 12/429,762, filed Apr. 24, 2009, Sasaki, et al.
U.S. Appl. No. 12/412,416, filed Mar. 27, 2009, Sasaki, et al.
U.S. Appl. No. 12/486,790, filed Jun. 18, 2009, Sasaki, et al.
U.S. Appl. No. 12/644,043, filed Dec. 22, 2009, Sasaki, et al.

* cited by examiner

*Primary Examiner*—John Cooney
(74) *Attorney, Agent, or Firm*—Oblon, Spivak, McClelland, Maier & Neustadt, L.L.P.

(57) ABSTRACT

To provide a flexible polyurethane foam having good vibration characteristics and suitable particularly for a seat for an automobile.

A flexible polyurethane foam obtainable by reacting a polyol composition with a polyisocyanate compound in the presence of a catalyst, a blowing agent and a foam stabilizer, characterized in that the polyol composition comprises a high molecular weight polyoxyalkylene polyol (A1) and a polymer-dispersed polyol (A2) containing fine polymer particles in the high molecular weight polyoxyalkylene polyol (A1), and at least part of the fine polymer particles contained in the polymer-dispersed polyol (A2) are fine polymer particles having silicon atoms.

18 Claims, No Drawings

FLEXIBLE POLYURETHANE FOAM, PROCESS FOR ITS PRODUCTION, AND SEAT FOR AUTOMOBILE USING THE FLEXIBLE POLYURETHANE FOAM

TECHNICAL FIELD

The present invention relates to a novel flexible polyurethane foam, suitable as a urethane cushion material providing good riding comfort, particularly for a seat for an automobile.

BACKGROUND ART

In recent years, in the field of polyurethane foams useful for various applications, various researches and developments have been made in order to improve the characteristics suitable for the respective applications. For example, along with upgrading of automobile seats in order to improve the riding comfort of seat cushion, it is targeted to improve the rebound resilience, vibration characteristics, durability, etc. With respect to the vibration characteristics, the influence of car body vibration over a human body varies depending upon the vibration frequency. However, it is considered effective for improvement of the riding comfort to take damping of vibration particularly large in a frequency range (for example from 4 to 8 Hz or from 6 to 20 Hz) to which a human is sensitive. Further, it is considered that in order to improve these characteristics, a seat cushion is effective which employs a polyoxyalkylene polyol having a higher molecular weight than one heretofore produced.

On the other hand, as a seat cushion, a combination of a metal spring with a pad material made of a flexible polyurethane foam (hereinafter referred to simply as a flexible foam) has been used in many cases. However, in recent years, there has been a trend of employing an automobile seat so-called a deep foam type whereby a metal spring is abolished by imparting spring characteristics to the flexible foam itself to meet the demand for e.g. cost down, reduction of weight, etc. The deep foam type seat has become thick, since no metal spring is used in combination.

Further, the characteristics of the flexible foam have become a factor substantially influential over the sitting comfort and riding comfort of the seat. Namely, the static characteristics and dynamic characteristics as indices for the sitting comfort and riding comfort, have been regarded as important in the development of flexible foams. Among the static characteristics, it is particularly important to control the supported feeling at the initial stage of sitting and the bottom-hitting feeling at the final stage of sitting.

When a person actually sits on a seat provided with a pad material of flexible foam, the flexible foam will be compressed and deflected, and the position of e.g. the hip will sink to a certain height. As a method for measuring this static characteristic (the static sitting feeling), a test method may be employed wherein the deflection is measured in a load test in accordance with a performance test method for a pad material for an automobile seat according to JASO automobile standard B408-89 (1989), to obtain a load-deflection curve, or the deflection under a load of 500N (Newton Load) may be used which is obtained from a load-deflection curve obtained by the measurement employing a pressure plate in accordance with JIS E7104 (2002). This pressure plate is oval with a long diameter A of 300 mm, a short diameter B of 250 mm and a thickness C of at least 35 mm and is so-called Tekken Plate.

On the other hand, the polyoxyalkylene polyol to be used as a material for the flexible foam, is usually produced by ring opening polymerization of an alkylene oxide such as propylene oxide, using a sodium/potassium catalyst such as sodium hydroxide or potassium hydroxide and an initiator such as a polyhydric alcohol. By this production method, an unsaturated monool having an unsaturated bond (hereinafter referred to simply as a monool) will be formed as a by-product, and the amount of such a monool produced, will increase with an increase of the molecular weight of the polyoxyalkylene polyol (a decrease of the hydroxyl value).

In the case of a polyoxyalkylene polyol having a hydroxyl value of about 56 mgKOH/g which is commonly used as a material for resilient polyurethane foams, the amount of such a monool produced, is not so large as to bring about a problem. However, in the case of a polyoxyalkylene polyol having a high molecular weight and a low hydroxyl value, the amount of such a monool produced, will be problematic. Namely, in a case where a resilient polyurethane foam is produced by using a polyoxyalkylene polyol having a high monool content (a high total unsaturation value), there will be a problem such as a decrease in hardness or a worse in compression set of the produced foam, or a worse in curing property at the time of production of the foam. Further, even if it is attempted to produce a polyoxyalkylene polyol having a low hydroxyl value by using a sodium/potassium catalyst, the amount of the monool produced will be so large that such production will be practically difficult.

Under the circumstances, a method has been proposed wherein in order to improve the characteristics such as the riding comfort, durability, etc. for an automobile seat, a polyoxyalkylene polyol having a low monool content is used for the production of a resilient polyurethane foam (Patent Document 1).

However, it has been found that a resilient polyurethane foam represented by a deep foam type produced by using a polyoxyalkylene polyol having a low monool content, has an extremely high rebound resilience (rebound resilience of core portion: 71 to 74%), whereby the riding comfort is inadequate from the viewpoint of the occupant posture-stability performance or supporting performance during traveling. In order to solve such problems, an invention has been proposed to suppress the rebound resilience by a combined use of a polyoxyalkylene polyol having a low unsaturation value and a polyoxyalkylene polyol having a low molecular weight with a hydroxyl value of from 90 to 300 mgKOH/g (Patent Document 2), but the hysteresis loss has been relatively large at a level of from 25 to 33%, such being disadvantageous from the viewpoint of the durability.

Further, with a seat of the above-mentioned deep foam type structure, the load-deflection characteristics are substantially influenced by the flexible foam itself, and it will be a seat having a relatively small difference in deflection on pressure side of from 500 N to 900 N, when the deflection under load is measured when it is pressed by the above-mentioned pressure plate from above. A seat having a small difference in deflection presents a bottom-hitting feeling and thus showed a tendency that the evaluation of the riding comfort was poor. Therefore, with a seat of deep foam type, in order to increase the difference in deflection, the thickness of the foam was increased. As a technique to increase the difference in deflection without increasing the thickness of the foam, it was proposed to use a fluorinated surfactant having a perfluoroalkyl group structure (Patent Document 3). However, a problem has been pointed out such that the effects tend to be different depending upon the structure of the fluorinated surfactant.

On the other hand, in a method for producing a polyurethane foam by reacting a polyol component comprising a polyol, a catalyst, a blowing agent and other additives with a polyisocyanate component, it has been proposed to add a certain specific bifunctional secondary amine in order to produce a foam having a reduced inclination of the curve on pressure side at a deflection of 75% as an index for evaluating the bottom-hitting feeling, which has no bottom-hitting feeling, and has all of the flexibility, the sinking degree and the vibration characteristics well balanced. However, the supported feeling was insufficient, and the durability particularly wet set was inadequate (Patent Document 4).

Further, a technique employing a polymer-dispersed polyol having fine polymer particles using a polymerizable unsaturated bond-containing monomer having a polysiloxane-containing group dispersed therein (Patent Document 5) and a technique employing a polymer-dispersed polyol having fine polymer particles using a polymerizable unsaturated bond-containing monomer having a polydiorganosiloxane-containing group dispersed therein (Patent Document 6) have been proposed. However, application to the field of polyurethane foams has not been disclosed.

Patent Document 1: JP-A-7-330843
Patent Document 2: JP-A-11-60676
Patent Document 3: JP-A-11-322875
Patent Document 4: JP-A-5-320304
Patent Document 5: JP-A-5-262833
Patent Document 6: JP-A-6-107763

DISCLOSURE OF THE INVENTION

Object to be Accomplished by the Invention

The present invention provides a novel flexible polyurethane foam having good vibration characteristics and excellent in the occupant posture-stability performance.

Means to Accomplish the Object

The gist of the present invention is as follows.
1. A flexible polyurethane foam obtained by reacting a polyol composition with a polyisocyanate compound in the presence of a catalyst, a blowing agent and a foam stabilizer, characterized in that the polyol composition comprises a high molecular weight polyoxyalkylene polyol (A1) and a polymer-dispersed polyol (A2) containing fine polymer particles in the high molecular weight polyoxyalkylene polyol (A1), and at least part of the fine polymer particles contained in the polymer-dispersed polyol (A2) are fine polymer particles having silicon atoms.
2. The above flexible polyurethane foam, characterized in that with respect to a foam obtained by foaming into a thickness of 100 mm, the 25% hardness (ILD) X (N/314 cm$^2$) measured in accordance with JIS K6400 (1997) and Y (mm) i.e. the value (the difference in deflection on pressure side) obtained by subtracting the deflection on 500 N pressure side from the deflection on 900 N pressure side obtained from a load-deflection curve as measured by means of a pressure plate (Tekken Plate) in accordance with JIS E7104 (2002), satisfy a relation formula represented by the following formula (5):

$$Y \geq -0.000370842 X^2 + 0.225401 X - 10.5013 \quad (5)$$

3. A seat for an automobile, which is made of the above flexible polyurethane foam.
4. A process for producing a flexible polyurethane foam, which comprises reacting a polyol composition with a polyisocyanate compound in the presence of a catalyst, a blowing agent and a foam stabilizer, characterized in that the polyol composition comprises a high molecular weight polyoxyalkylene polyol (A1) and a polymer-dispersed polyol (A2) containing fine polymer particles in the high molecular weight polyoxyalkylene polyol (A1), and at least part of the fine polymer particles contained in the polymer-dispersed polyol (A2) are fine polymer particles having silicon atoms.

In the above invention, the fine polymer particles having silicon atoms are preferably fine polymer particles obtained by polymerizing a silicon-containing acrylate or a silicon-containing methacrylate. Further, the silicon-containing acrylate or the silicon-containing methacrylate is preferably represented by the following formula (1), (2) or (3):

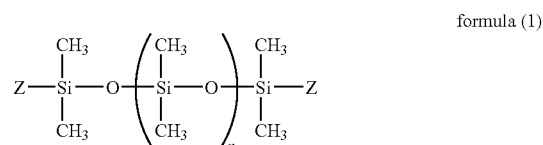

formula (1)

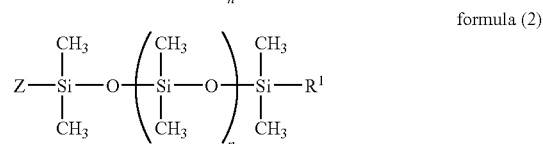

formula (2)

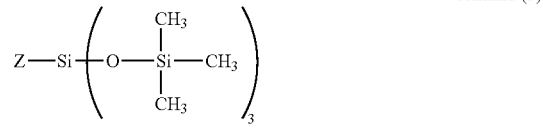

formula (3)

provided that R$^1$ in the formula (2) is a C$_{1\text{-}20}$ alkyl group, "n" in the formulae (1) and (2) is an integer of from 1 to 1,000, and Z in the formulae (1) to (3) is an organic group represented by the formula (4):

$$-R^2-OCOCR^3=CH_2 \quad \text{formula (4)}$$

wherein R$^2$ is a C$_{1\text{-}20}$ alkylene group, and R$^3$ is a hydrogen atom or a methyl group.

Hereinafter sometimes an acrylate and a methacrylate will collectively be referred to as a (meth)acrylate.

EFFECTS OF THE INVENTION

The present invention provides a novel flexible polyurethane foam having good vibration characteristics and excellent in occupant posture-stability performance, by using a specific polymer-dispersed polyol.

BEST MODE FOR CARRYING OUT THE INVENTION

To produce the flexible polyurethane foam of the present invention, a polyol composition comprising a high molecular weight polyoxyalkylene polyol (A1) and a polymer-dispersed polyol (A2) is used.

(High Molecular Weight Polyoxyalkylene Polyol (A1))

The high molecular weight polyoxyalkylene polyol (A1) to be used for producing the flexible polyurethane foam of the present invention, is preferably one obtained by ring opening polymerization of a cyclic ether using, as an initiator, an active hydrogen compound having an average number of hydroxyl groups of from 2 to 6, in the presence of a polymerization catalyst. The molecular weigh per hydroxyl group is preferably at least 500, more preferably from 1,000 to 5,000. The molecular weight per hydroxyl group is particularly preferably from 1,500 to 2,500.

The average number of hydroxyl groups in the high molecular weight polyoxyalkylene polyol is the average number of hydroxyl groups in the initiator used. Further, the high molecular weight polyoxyalkylene polyol (A1) is regarded as having a molecular weight calculated by the following formula based on the hydroxyl value measured in accordance with JIS K-1557 (1970):

Molecular weight=(56100×the average number of hydroxyl groups in the polyol)/hydroxyl value The polymerization catalyst may, for example, be an alkali metal compound or an alkali metal hydroxide such as a potassium compound, e.g. potassium hydroxide or potassium methoxide, a cesium compound, e.g. cesium metal, cesium hydroxide, cesium carbonate or cesium methoxide; a cationic polymerization catalyst such as boron trifluoride; a double metal cyanide complex; or a phosphazenium compound.

Among these catalysts, a usual alkali metal compound such as potassium hydroxide, a cesium compound or a double metal cyanide complex is preferred, and in order to obtain a polymer having a high molecular weight, a double metal cyanide complex is particularly preferred.

The double metal cyanide complex catalyst may, for example be one disclosed in JP-B-46-27250. Specifically, it may, for example, be a complex containing zinc hexacyanocobaltate as the main component, preferably an ether and/or an alcohol complex thereof. As the ether, ethylene glycol dimethyl ether (glyme), diethylene glycol dimethyl ether (diglyme), ethylene glycol mono-tert-butyl ether (METB), ethylene glycol mono-tert-pentyl ether (METP), diethylene glycol mono-tert-butyl ether (DETB), tripropylene glycol monomethyl ether (TPME) or the like is preferred. As the alcohol, tert-butyl alcohol or the like is preferred.

The cyclic ether to be subjected to ring opening polymerization is preferably an alkylene oxide having at least 2 carbon atoms, and specifically, it may, for example, be ethylene oxide, propylene oxide, 1,2-butylene oxide, 2,3-butylene oxide or styrene oxide. Among them, a combination of ethylene oxide and at least one member selected from propylene oxide, 1,2-butylene oxide and 2,3-butylene oxide is particularly preferred.

Further, the high molecular weight polyoxyalkylene polyol (A1) preferably has oxyethylene groups, particularly preferably has oxyethylene groups at its terminals. Further, it may be a polyoxyalkylene polyol having oxyethylene groups in its inside. The polyoxyalkylene polyol having oxyethylene groups in its inside may be obtained, for example, by sequentially mixing an initiator, an alkylene oxide having at least 3 carbon atoms and ethylene oxide to carry out ring opening polymerization.

The polyoxyalkylene polyol having oxyethylene groups at its terminals may be obtained, for example, by subjecting an alkylene oxide having at least 3 carbon atoms and an initiator to ring opening polymerization and then subjecting ethylene oxide to ring opening polymerization. Otherwise, it may be obtained by sequentially mixing the above-described initiator, alkylene oxide having at least 3 carbon atoms and ethylene oxide to carry out ring opening polymerization, and then subjecting ethylene oxide to ring opening polymerization.

The lower limit of the content of the terminal oxyethylene groups in the polyoxyalkylene polyol (A1) is preferably 3 mass %, particularly preferably 5 mass %. The upper limit is preferably 25 mass %. When the content of the terminal oxyethylene groups is at least 3 mass %, collapse of the foam, etc. can effectively be suppressed. Further, when it is at most 25 mass %, breakage of the foam at the time of crushing treatment, or shrinkage or the like after the crushing treatment will be prevented without an increase of closed cells of the foam. The content of all oxyethylene groups is preferably at most 30 mass %.

The initiator may, for example, be ethylene glycol, diethylene glycol, dipropylene glycol, neopentyl glycol, 1,4-butanediol, 1,6-hexanediol, glycerol, trimethylolpropane, pentaerythritol, diglycerol, dextrose, sucrose, bisphenol A or the like, or a compound obtained by adding a small amount of an alkylene oxide to the above initiators. The initiators may be used preferably alone or in combination of two or more of them. If the average number of hydroxyl groups is less than 2, the durability and the riding comfort of the foam may decrease in some cases. On the other hand, if the average number of hydroxyl groups is more than 6, the flexible foam to be produced tends to be hard and tends to have impaired mechanical properties such as elongation.

In the present invention, it is preferred to use a polyoxyalkylene polyol (a) as at least a part of the high molecular weight polyoxyalkylene polyol (A1). The polyoxyalkylene polyol (a) is a high molecular weight polyoxyalkylene polyol (A1), which is a polyoxyalkylene polyol having an unsaturation value of at most 0.07 meq/g (hereinafter sometimes referred to as polyol (a)). Particularly, in the high molecular weight polyoxyalkylene polyol (A1), the amount of the polyol (a) is preferably from 30 to 100 mass %, particularly preferably from 40 to 100 mass %. Further, in a case where the high molecular weight polyoxyalkylene polyol (A1) contains fine polymer particles as described hereinafter, the ratio of the high molecular weight polyoxyalkylene polyol (A1) and the polyol (a) is calculated on the basis of the mass of the polyols excluding the fine polymer particles.

The average molecular weight per hydroxyl group of the polyol (a) is preferably at least 500, more preferably from 1,000 to 5,000, particularly preferably from 1,500 to 2,500. If the average molecular weight per hydroxyl group is lower than 1,500, the durability and the riding comfort of the polyurethane foam may decrease in some cases. On the other hand, if it is higher than 2,500, the viscosity of the polyol tends to be high, whereby the operation efficiency tends to deteriorate.

Further, the polyol (a) preferably contains oxyethylene groups at its terminals, and the preferred range of the content is as described with respect to the high molecular weight polyoxyalkylene polyol (A1). The polyol (a) is preferably a polyol having a content of oxypropylene groups of at least 70 mass %, particularly preferably at least 75 mass %.

The polyol (a) has an unsaturation value of at most 0.07 meq/g, particularly preferably at most 0.05 meq/g. If the unsaturation value of the polyol (a) is larger than 0.07 meq/g, the durability and riding comfort of the polyurethane foam may sometimes decrease.

(Polymer-Dispersed Polyol (A2))

In the present invention, a polymer-dispersed polyol (A2) containing fine polymer particles in the high molecular weight polyoxyalkylene polyol (A1) is used. Such a polymer-dispersed polyol (A2) contains fine polymer particles in a polyoxyalkylene polyol matrix, and the fine polymer particles are preferably contained as stably dispersed.

The content of the fine polymer particles contained in the polymer-dispersed polyol (A2) is preferably at most 50 mass %. If the content of the fine polymer particles is higher than 50 mass %, the viscosity tends to be high, such being troublesome. The fine polymer particles are contained preferably in an amount of from 1 to 35 mass % in the polymer-dispersed polyol (A2). The concentration of the fine polymer particles in the polyol composition is preferably from 0.1 to 50 mass %, more preferably from 0.01 to 15 mass % based on 100 mass % of the entire polyol composition containing the fine polymer particles.

The fine polymer particles are preferably fine particles of an addition polymerization type polymer or a condensation polymerization type polymer, particularly preferably an addition polymerization type polymer. However, in the present invention, fine polymer particles having silicon atoms are used at least part of the fine polymer particles. The fine polymer particles having silicon atoms are particularly preferably fine polymer particles obtained by polymerizing a monomer containing a silicon-containing (meth)acrylate.

The addition polymerization type polymer may, for example, be a homopolymer or copolymer of a polymerizable unsaturated bond-containing monomer such as acrylonitrile, styrene, a (meth)acrylate containing no silicon atom or a silicon-containing (meth)acrylate.

The condensation polymerization type polymer may, for example, be a polyester, a polyurea, a polyurethane or a melamine resin.

By the presence of such fine polymer particles, the hydroxyl value of the entire polymer-dispersed polyol may usually be made lower than the hydroxyl value of the matrix polyol.

The silicon-containing (meth)acrylate is preferably a (meth)acrylate represented by the following formula (1), (2) or (3):

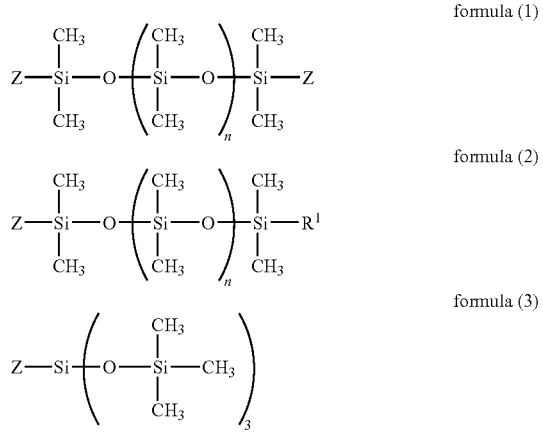

formula (1)

formula (2)

formula (3)

$R^1$ in the formula (2) is a $C_{1-20}$ alkyl group (which may or may not be branched), preferably a $C_{1-10}$ alkyl group, particularly preferably a $C_{1-6}$ alkyl group. Further, "n" in the formulae (1) and (2) is an integer of from 1 to 1,000, preferably an integer of from 1 to 300, particularly preferably an integer of from 1 to 200. When "n" is from 1 to 1,000, favorable stability of the foam at the time of foaming will be achieved. Further, Z in the formulae (1) to (3) is an organic group represented by the formula (4):

formula (4)

wherein $R^2$ is a $C_{1-20}$ alkylene group (which may or may not be branched), preferably a $C_{1-10}$ alkylene group, particularly preferably a $C_{1-6}$ alkylene group, and $R^3$ is a hydrogen atom or a methyl group.

The silicon-containing (meth)acrylate may be homopolymerized or may be copolymerized with another polymerizable unsaturated bond-containing monomer, but is preferably copolymerized from the viewpoint of stability in the polyol. Such another polymerizable unsaturated bond-containing monomer which may be used together with the silicon-containing (meth)acylate may, for example, be a nitrile monomer such as acrylonitrile or methacrylonitrile; a styrene monomer such as styrene or α-methyl styrene; a (meth)acrylate monomer having no fluorine atom, such as methyl methacrylate, ethyl methacrylate, hydroxyethyl methacrylate, methyl acrylate, ethyl acrylate or hydroxyethyl acrylate; a vinyl ester monomer such as vinyl acetate; a vinyl ether monomer such as methyl vinyl ether; or an unsaturated aliphatic monomer such as maleic acid diester. Such monomers may be used in combination of two or more of them. In the present invention, the above another polymerizable unsaturated bond-containing monomer is preferably a nitrile monomer, a styrene monomer or a (meth)acrylate monomer having no fluorine atom, particularly preferably acrylonitrile, styrene or methyl methacrylate.

In the present invention, fine polymer particles obtained by polymerizing (homopolymerizing or copolymerizing) a silicon-containing (meth)acrylate are used as at least a part of the fine polymer particles in the polymer-dispersed polyol (A2). In the present invention, it is preferred to use fine polymer particles obtained by polymerizing a monomer containing a silicon-containing (meth)acrylate and fine polymer particles obtained by polymerizing a monomer containing no silicon-containing (meth)acrylate in combination. In the present invention, the ratio of fine polymer particles obtained by polymerizing a monomer containing a silicon-containing (meth)acrylate in the entire fine polymer particles in the polymer-dispersed polyol (A2) is preferably from 0.0001 ($1 \times 10^{-4}$) to 30 mass %, more preferably from 0.001 to 10 mass %. Further, the ratio of fine polymer particles directly derived from the silicon-containing (meth)acrylate monomer in the entire fine polymer particles (the ratio of the silicon-containing (meth)acrylate monomer based on the mass of the entire monomers used to produce the fine polymer particles) is preferably from 0.00001 ($1 \times 10^{-5}$) to 20 mass %, more preferably from 0.0001 to 5 mass %. Further, the ratio of the fine polymer particles obtained by polymerizing a monomer containing a silicon-containing (meth)acrylate in the polyol composition is preferably from 0.00001 ($1 \times 10^{-5}$) to 5 mass %, more preferably from 0.0001 to 0.5 mass %.

(Process for Producing Polymer-Dispersed Polyol (A2))

As a process for producing the polymer-dispersed polyol (A2), a known production process may be employed. For example, a polymerizable unsaturated bond-containing monomer is polymerized in the high molecular weight polyoxyalkylene polyol (A1), in the presence of a solvent or a grafting agent if desired, to obtain a polymer-dispersed polyol (A2). Further, the polymerizable unsaturated bond-containing monomer is polymerized in a solvent, in the presence of a grafting agent if desired, and the solvent is replaced with the high molecular weight polyoxyalkylene polyol (A1) to obtain the polymer-dispersed polyol (A2). The former production process is preferred in view of stability of the fine polymer particles.

To polymerize the polymerizable unsaturated bond-containing monomer, usually a polymerization initiator which forms free groups to initiate the polymerization is used. Specifically, it may, for example, be 2,2-azobis-isobutyronitrile (AIBN), 2,2-azobis-2-methylbutyronitrile (AMBN), 2,2-azobis-2,4-dimethylvaleronitrile, benzoyl peroxide, diisopropyl peroxydicarbonate, acetyl peroxide, di-tert-butyl peroxide or a persulfate. It is particularly preferably AIBN or AMBN.

The amount of the polymerization initiator to be used is preferably from 0.01 to 10 mass % based on 100 mass % of the total amount of the high molecular weight polyoxyalkylene polyol (A2), the silicon-containing (meth)acrylate, another polymerizable unsaturated bond-containing monomer and the grafting agent.

The polymerization reaction is carried out at the decomposition temperature of the polymerization initiator or above, usually from 80 to 160° C., preferably from 90 to 150° C., particularly preferably from 100 to 130° C.

After completion of the polymerization reaction, the obtained polymer-dispersed polyol (A2) may be used as a material of a flexible polyurethane foam as it is, but it is preferably subjected to vacuum treatment to remove unreacted monomers and then used, in view of stability of the polymer-dispersed polyol (A2).

As a process for producing the polymer-dispersed polyol (A2), there is a batch process wherein a part of the high molecular weight polyoxyalkylene polyol (A1) is charged to a reactor, and to the reactor, a mixture of the remaining high molecular weight polyoxyalkylene polyol (A1), the polymerizable unsaturated bond-containing monomer, the polymerization initiator and the like is gradually fed with stirring to carry out polymerization. Further, there is a continuous process wherein a mixture of the high molecular weight polyoxyalkylene polyol (A1), the polymerizable unsaturated bond-containing monomer, the polymerization initiator and the like is continuously fed to a reactor with stirring, and simultaneously a composition containing the polymer-dispersed polyol (A2) formed is continuously discharged from the reactor. In the present invention, either process may be applied. A solvent, a chain transfer agent and the like may be used if desired.

In general, the higher the polymer concentration, the more coagulation of particles occurs in process of growth of particles at the time of monomer polymerization, whereby agglomerates are likely to form. To prevent formation of agglomerates, production of the polymer-dispersed polyol (A2) may be carried out in the presence of a solvent.

The solvent may, for example, be an alcohol such as methanol, ethanol, isopropanol, butanol, cyclohexanol or benzyl alcohol; an aliphatic hydrocarbon such as pentane, hexane, cyclohexane or hexene; an aromatic hydrocarbon such as benzene, toluene or xylene; a ketone such as acetone, methylethyl ketone or acetophenone; an ester such as ethyl acetate or butyl acetate; an ether such as isopropyl ether, tetrahydrofuran, benzyl ethyl ether, acetal, anisole or methyl-tert-butyl ether; a halogenated hydrocarbon such as chlorobenzene, chloroform or dichloroethane; a nitrile such as acetonitrile or benzonitrile; an amide such as N,N'-dimethylformamide or N-methylpyrrolidone; or a sulfur compound such as dimethyl sulfoxide or sulfolane. In the present invention, these solvents may be used alone or as mixed. After the polymerization of a monomer having a polymerizable unsaturated bond is completed, the solvent is removed. Removal of the solvent is carried out usually by heating under reduced pressure. However, removal of the solvent may be carried out by heating under normal pressure or at room temperature under reduced pressure. On that occasion, unreacted monomers are also removed together with the solvent.

In the present invention, polymerization may be carried out by using a chain transfer agent. The chain transfer agent is preferably an alkyl mercaptan. The alkyl mercaptan may, for example, be dodecyl mercaptan or mercaptoethanol.

The polymer-dispersed polyol (A2) having fine polymer particles stably dispersed are obtained by the above production process. However, a stable dispersion system is hardly obtained in some cases depending on the monomer used. A grafting agent (a stabilizer) may be used so as to further improve dispersion stability of the fine polymer particles.

The grafting agent is preferably a compound having a double bond in its molecule. It may, for example, be a high molecular weight polyol or monool obtained by reacting an alkylene oxide to an active hydrogen compound having a double bond-containing group such as a vinyl group, an allyl group or an isopropyl group as an initiator; a high molecular weight polyol or monool obtained by reacting a polyol with an unsaturated carboxylic acid or its anhydride such as maleic anhydride, itaconic anhydride, maleic acid, fumaric acid, acrylic acid or methacrylic acid, and as the case requires, adding an alkylene oxide such as propylene oxide or ethylene oxide; a reaction product of an unsaturated alcohol such as 2-hydroxyethyl acrylate or butenediol, another polyol and a polyisocyanate; or a reaction product of an unsaturated epoxy compound such as allyl glycidyl ether with a polyol. Such a compound preferably has a hydroxyl group, but the grafting agent is not limited to such a compound.

(Polyol Composition)

In the present invention, the polyol composition comprises the high molecular weight polyoxyalkylene polyol (A1) and the polymer-dispersed polyol (A2). However, it may contain another polyol in addition to the above. The ratio of the another polyol is preferably from 0 to 10 mass %, particularly preferably from 0 to 8 mass % in the polyol composition. The ratio of the high molecular weight polyoxyalkylene polyol (A1) in the polyol composition is preferably from 40 to 95 mass %, particularly preferably from 40 to 85 mass %. The ratio of the polymer-dispersed polyol (A2) in the polyol composition is preferably from 5 to 60 mass %, particularly preferably from 15 to 60 mass %.

(Foam Stabilizer)

As the foam stabilizer, it is preferred to use a silicone compound. As the silicone compound, a silicone foam stabilizer which is commonly used for a flexible urethane foam, may be used. The amount of the silicone foam stabilizer is preferably from 0.001 to 3 parts by mass, particularly preferably from 0.1 to 2 parts by mass per 100 parts by mass of the total amount of the polyol composition.

(Polyisocyanate Compound)

The polyisocyanate compound to be used for the production of the polyurethane foam of the present invention is preferably an aromatic polyisocyanate, such as tolylene diisocyanate (TDI), diphenylmethane diisocyanate (MDI) or polymethylenepolyphenyl polyisocyanate (crude MDI). These polyisocyanates may be in the form of a mixture, and a mixture of TDI and crude MDI in a mass ratio of from 85/15 to 75/25 is preferred.

The amount of the polyisocyanate compound is such that the numerical value (this value is usually referred to as an isocyanate index) represented by 100 times the ratio of the number of isocyanate groups to the total number of active hydrogen such as the polyoxyalkylene polyol and water, is preferably from 80 to 120, particularly preferably from 85 to 115.

(Blowing Agent)

As the blowing agent in the present invention, at least one blowing agent selected from water and an inert gas is preferably used. As the inert gas, air, nitrogen or carbon dioxide may, for example, be mentioned. It is preferred to use only water. The amount of such a blowing agent is not particularly limited, and in a case where only water is used, it is preferably at most 10 parts by mass, particularly preferably from 0.1 to 8 parts by mass, per 100 parts by mass of the high molecular weight polyoxyalkylene polyol. Other blowing agent may also be used in combination in a proper amount depending upon the requirement for e.g. a desired foaming degree.

(Cell Opener)

In the present invention, a cell opener may be used. As the cell opener, preferred is a polyol having an average number of hydroxyl groups of from 2 to 8, having a hydroxyl value of from 20 to 100 mgKOH/g, and having a content of oxyethylene groups of from 50 to 100 mass %. The amount of such a cell opener to be used is preferably from 0.01 to 10 parts by mass, particularly preferably from 0.1 to 10 parts by mass, per 100 parts by mass of the polyol composition (excluding the cell opener).

(Crosslinking Agent)

In the present invention, a crosslinking agent may be used. As the crosslinking agent, preferred is a polyol having an average number of hydroxyl groups of from 2 to 8 and a hydroxyl value of from 200 to 2,000 mgKOH/g. The amount of the crosslinking agent is preferably from 0.1 to 10 parts by mass, particularly preferably from 0.5 to parts by mass, per 100 parts by mass of the polyol composition (excluding the crosslinking agent).

(Catalyst)

As the catalyst in the present invention, a catalyst which accelerates the urethane-forming reaction may be used. For example, a tertiary amine such as triethylene diamine, bis[(2-dimethylamino)ethyl]ether or N,N,N',N'-tetramethylhexamethylenediamine, a metal carboxylate such as potassium acetate or potassium 2-ethylhexanoate, or an organic metal compound such as dibutyl tin dilaurate or stannous octoate may be mentioned.

(Others)

In the present invention, known various additives and adjuvants may be used as the case requires, such as an emulsifier, an aging preventive agent such as an antioxidant or an ultraviolet absorber, a filler such as calcium carbonate or barium sulfate, a flame retardant, a plasticizer, a colorant and an anti-fungus agent.

(Process for Producing Flexible Polyurethane Foam)

The production and molding of the flexible polyurethane foam is preferably carried out by a method of pouring a reactive mixture directly into a mold by means of a low pressure foaming machine or a high pressure foaming machine (i.e. a reactive injection molding method) or a method of pouring the reactive mixture into an open state mold. The high pressure foaming machine is usually preferably of a type in which two liquids are mixed, and one liquid is a polyisocyanate compound, and the other liquid is a mixture of all materials other than the polyisocyanate compound. In some cases, a reactive mixture may be prepared by a total of three components having a catalyst, a cell opener is (which is usually used as dispersed or dissolved in a part of the high molecular weight polyoxyalkylene polyol), etc. as a separate component. The flexible polyurethane foam of the present invention is usually produced by a cold curing method, but it may be produced also by a method other than the cold curing method, such as a method containing a heating step.

(Physical Properties of Flexible Foam)

The core density of the flexible polyurethane foam of the present invention is preferably from 30 to 70 kg/m$^3$, and to be suitable for a seat cushion for an automobile, the core density is particularly preferably from 35 to 60 kg/m$^3$. If the core density is lower than 30 kg/m$^3$, the durability and the riding comfort performance tend to deteriorate. Further, if the core density exceeds 70 kg/m$^3$, the durability and the riding comfort performance may be good, but such a high density is undesirable since it hinders improvement of the fuel efficient.

The hardness of the flexible polyurethane foam of the present invention is such that with respect to a foam obtained by foaming into a thickness of 100 mm, the 25% hardness (ILD) measured in accordance with JIS K-6400 (1997) is preferably from 180 to 500 N/314 cm$^2$, more preferably from 180 to 350 N/314 cm$^2$. If it is lower than 180 N/314 cm$^2$, the supported feeling of occupant tends to be impaired, such being undesirable. On the other hand, if it exceeds 500 N/314 cm$^2$, the deflection as a seat tends to be small, thus leading to a decrease of the riding comfort, such being undesirable.

The flexible polyurethane foam of the present invention is preferably such that with respect to a foam obtained by foaming into a thickness of 100 mm, X (N/314 cm$^2$) i.e. the 25% hardness (ILD) measured in accordance with JIS K6400 (1997) and Y (mm) i.e. the value (difference in deflection on pressure side) obtained by subtracting the deflection on 500 N pressure side from the deflection on 900 N pressure side obtained from a load-deflection curve measured by means of a pressure plate (Tekken Plate) in accordance with JIS E7104 (2002) by applying a load at a constant rate of at most 10 mm/sec, satisfy a relation formula represented by the formula (5):

$$Y \geq -0.000370842X^2 + 0.225401X - 10.5013 \qquad (5)$$

By satisfying the range of the above relation formula, it is possible to secure a sufficient deflection as a seat.

Further, the flexible polyurethane foam of the present invention is preferably such that with respect to a foam obtained by foaming into a thickness of 100 mm, when the deflection on 500 N pressure side obtained from a load-deflection curve as measured by means of a pressure plate (Tekken Plate) in accordance with JIS E7104 (2002) by applying a load at a constant rate of at most 10 mm/sec, is from 5.0 to 55.0 mm, Y (mm) i.e. the value (the difference in deflection on pressure side) obtained by subtracting the deflection on 500 N pressure side from the deflection on 900 N pressure side, is from 22.5 to 33.0 mm, particularly preferably from 23.0 to 33.0 mm.

When the deflection on 500 N pressure side is from 5.0 to 55.0 mm, if Y (mm) i.e. the value (the difference in deflection on pressure side) obtained by subtracting the deflection on 500 N pressure side from the deflection on 900 N pressure side in a foam thickness of 100 mm, is less than 22.5 mm, the bottom-hitting feeling of the seat tends to result, such being undesirable. On the other hand, if the Y i.e. the difference (mm) in deflection on pressure side exceeds 33.0 mm, the posture-stability performance tends to be poor, such being undesirable.

The flexible polyurethane foam of the present invention is further preferably such that with respect to a foam obtained by foaming into a thickness of 100 mm, when the deflection on 500 N pressure side obtained from a load-deflection curve measured by means of a pressure plate (Tekken Plate) in accordance with JIS E7104 (2002) by applying a load at a constant rate of at most 10 mm/sec, is from 18.0 to 55.0 mm, Y (mm) i.e. the value (the difference in deflection on pressure side) obtained by subtracting the deflection on 500 N pressure side from the deflection on 900 N pressure side, is from 22.5 to 33.0 mm, more preferably from 23.0 to 33.0 mm.

EXAMPLES

Now, the present invention will be described in further detail with reference to Examples, but the present invention is by no means thereby restricted.

The blend proportions (unit: parts by mass) at the time of the production of the foam, and foam physical properties, vibration characteristics and moldability of the flexible polyurethane foam thereby obtained, are shown in Tables 3 to 5. Examples 1 to 6 are Examples of the present invention, and Example 7 is a Comparative Example.

The unsaturation value was measured by the method in accordance with JIS K1557 (1970).

Among materials shown in Tables 3 to 5, a mixture (polyol-containing mixture) of all materials except for a polyisocyanate compound was adjusted to 30° C.±1° C., and an isocyanate compound was adjusted to 25° C.±1° C. Then, the polyisocyanate compound was added to the polyol-containing mixture so as to agree with the isocyanate index as shown in Tables 3 to 5. Thereafter, the mixture was mixed and stirred by means of a high speed mixer (3,000 rpm) for 5 seconds, and it was immediately poured into a mold having an internal dimension of 400 mm in length and width and 100 mm in height, which was heated at 60° C., and closed. After 6 minutes of curing, the obtained flexible polyurethane foam was removed from the mold and then left to stand for at least 24 hours. Thereafter, various physical properties were measured.

Foam Physical Properties

As the foam physical properties, the total density (unit: $kg/m^3$), the density (unit: $kg/m^3$) of core portion, the 25% hardness (ILD) (unit: $N/314\ cm^2$), the rebound resilience (unit: %) of core portion, the tear strength (unit: N/cm), the tensile strength (unit: kPa), the elongation (unit: %), the dry heat compression set (Dry set) (unit: %), the wet heat compression set (Wet set) (unit: %) and the hysteresis loss (unit: %) were evaluated.

The density of core portion and the rebound resilience of core portion were measured by using a sample cut out from the center portion of the foam excluding the skin portion, in a size of 100 mm×100 mm×50 mm in height.

Further, the total density, the density of core portion, the 25% hardness (ILD), the rebound resilience of core portion, the tear strength, the tensile strength, the elongation, the dry set, the wet set, and the hysteresis loss were measured in accordance with JIS K6400 (1997). Here, the hysteresis loss was measured by using a pressure plate (Tekken Plate) in accordance with JIS E7104 (2002).

In the test method for obtaining the load-deflection curve, the measurement was carried out by using a pressure plate of an oval shape having a long diameter A of 300 mm, a short diameter B of 250 mm and a thickness C of at least 35 mm in accordance with JIS E7104 (2002) and by applying a load at a constant rate of 1.7 mm/sec. From the load-deflection curve, the deflection (mm) under a load of 500 N (Newton load) was obtained. Y (mm) i.e. the difference in deflection on pressure side was obtained from the deflection (mm) on pressure side under a load of 900 N and the deflection on pressure side under a load of 500 N (the value obtained by subtracting the latter from the former, is Y).

The 25% hardness (ILD) is represented by X ($N/314\ cm^2$), and the value y was calculated by the following formula (6).

$$y = -0.000370842X^2 + 0.225401X - 10.5013 \quad (6)$$

Vibration Characteristics

As the vibration characteristics, the resonance frequency (unit: Hz), the transmissibility at resonance frequency (the absolute displacement measured) and the transmissibility at 6 Hz were evaluated. The resonance frequency, the transmissibility at resonance frequency (the absolute displacement measured) and the transmissibility at 6 Hz were measured by methods in accordance with JASO B407-87. As the conditions for measuring the vibration characteristics, a Tekken Plate (load: 490 N) was used as a pressure plate, and the vibration total amplitude was adjusted to be 5 mm.

Moldability

For the moldability, crushing performance was evaluated. Here, the crushing performance is one obtained by evaluating the permeability of the foam. Namely, the obtained flexible polyurethane foam was passed through rollers to exert a pressure to the foam, whereby the load required to let the foam cells opened, was evaluated. The required load is small as the ratio of closed cells in the foam is low i.e. as the communication performance is good.

Starting Materials Used

Polyol A1a: a polyoxypropyleneoxyethylene polyol having an average number of hydroxyl groups of 3, a hydroxyl value of 33 mgKOH/g (molecular weight per hydroxyl group: 1,700), an unsaturation value of 0.04 meq/g, and having polyoxyethylene groups in an amount of 16 mass % at its terminals.

Polyol A1b: a polyoxypropyleneoxyethylene polyol having an average number of hydroxyl group of 3, a hydroxyl value of 34 mgKOH/g (molecular weight per hydroxyl group: 1,650), an unsaturation value of 0.07 meq/g, and having polyoxyethylene groups in an amount of 14.5 mass % at its terminals.

Polyol A1c: Using a potassium hydroxide catalyst, propylene oxide was subjected to ring opening addition polymerization using glycerol as an initiator, followed by purification to obtain a polyoxypropylene polyol having a molecular weight of 1,500. To 1,500 g of the polyoxypropylene polyol, 1,142 g of propylene oxide was subjected to ring opening addition polymerization using a zinc hexacyanocobaltate complex catalyst having tert-butyl alcohol as a ligand, and then 3,498 g of a mixture of propylene oxide with ethylene oxide (propylene oxide:ethylene oxide=90:10 mass ratio) was subjected to ring opening addition polymerization. To the polyoxyalkylene polyol, 1,000 g of ethylene oxide was subjected to ring opening addition polymerization using a potassium hydroxide catalyst, followed by purification, thereby to obtain a polyoxypropyleneoxyethylene polyol having a hydroxyl value of 23.6 mgKOH/g, an unsaturation value of 0.005 meq/g, an amount of terminal oxyethylene blcok groups of 14 mass %, and an amount of all oxyethylene groups of 19 mass %.

Polyol A2a: a polymer-dispersed polyol having an amount of fine polymer particles of 35 mass %, obtained by copolymerizing acrylonitrile with styrene in the above polyol A1b.

Crosslinking agent d1: diethanolamine

Crosslinking agent d2: a polyoxyethylene polyol having an average number of hydroxyl groups of 4 and a hydroxyl value of 562 mgKOH/g (molecular weight per hydroxyl group: 100).

Catalyst e1: a dipropylene glycol solution of triethylenediamine, TEDA-L33, tradename, manufactured by TOSOH CORPORATION.

Catalyst e2: a dipropylene glycol solution of bis-[(2-dimethylamino)ethyl]ether, TOYOCAT-ET, tradename, manufactured by TOSOH CORPORATION.

Silicone foam stabilizer f1: SZ-1355, tradename, manufactured by Toray Dow Corning Silicone.

Silicone foam stabilizer f2: SZ-1327, tradename, manufactured by Toray Dow Corning Silicone.

Silicone foam stabilizer f3: SZ-1325, tradename, manufactured by Toray Dow Corning Silicone.

Blowing agent h: water

Polyisocyanate j: a mixture of TDI (mixture of 2,4-tolylene diisocyanate/2,6-tolylene diisocyanate in a ratio of 80/20 mass %: T-80) and polymethylenepolyphenyl polyisocyanate in a ratio of 80/20 mass %, having a NCO group content of 44.8%. CORONATE 1021, tradename, manufactured by Nippon Polyurethane Industry Co., Ltd.

Production of Silicon-Containing Polymer-Dispersed Polyol (g1 to g4)

Polyol A1b was charged to a reactor, and while the temperature was kept at 120° C., a mixture of a silicon-containing methacrylate, another polymerizable unsaturated bond-containing monomer, a grafting agent, a solvent (methyl-tert-butyl ether) and a polymerization initiator (AMBN) in a mass ratio as identified in Table 2 was fed over a period of one hour with stirring, and after completion of feeding, stirring was continued at the same temperature for about 0.5 hour. After completion of the reaction, the obtained silicon-containing polymer-dispersed polyol was heated and deaerated under reduced pressure at 120° C. under 0.01 kPa to remove unreacted monomers and the solvent. The hydroxyl value and the viscosity of the obtained silicon-containing polymer-dispersed polyol together with the mass ratio of the materials used for the reaction are shown in Table 2. Further, structures of the silicon-containing methacrylates p1 to p3 are shown in Table 1. $R^1$ is as defined for the formula (2), "n" is as defined for the formula (2), and $R^2$ is as defined for the formula (4).

TABLE 1

| | Silicon-containing methacrylate | | |
|---|---|---|---|
| Structure | p1 Formula (2) | p2 Formula (2) | p3 Formula (3) |
| $R^1$ | $CH_3$ | $CH_3$ | — |
| n | 59 | 25 | — |
| $R^2$ | $C_3H_6$ | $C_3H_6$ | $C_3H_6$ |
| $R^3$ | $CH_3$ | $CH_3$ | $CH_3$ |

Grafting Agent

A polyoxypropyleneoxyethylene polyol having an average number of hydroxyl groups of 3, a hydroxyl value of 26 mgKOH/g and a total oxyethylene content of 8.7 mass %, and 2-hydroxyethyl methacrylate (2-HEMA) were charged to a reactor, and tolylene diisocyanate (T-80) and triethylamine were added, followed by stirring at 80° C. for reaction. The ratio is such that 1 mol of 2-HEMA and 1 mol of tolylene diisocyanate were used per 1 mol of the polyoxypropyleneoxyethylene polyol. Then, vacuum treatment was carried out at 80° C. to remove unreacted monomers. The resulting product was used as a grafting agent.

TABLE 2

| | Silicon-containing polymer-dispersed polyol | | | |
|---|---|---|---|---|
| | g1 | g2 | g3 | g4 |
| Polyol A1b | 90 | 90 | 85 | 90 |
| Acrylonitrile | 7 | 7 | | 5 |
| Styrene | | | 7 | |
| Silicon-containing methacrylate p1 | 3 | | 3 | |
| Silicon-containing methacrylate p2 | | 3 | | |
| Silicon-containing methacrylate p3 | | | | 5 |
| Grafting agent | | | 5 | |
| Polymerization initiator | 0.5 | 0.5 | 0.5 | 0.5 |
| Solvent | 4 | 4 | | |
| Hydroxyl value (mgKOH/g) | 32.2 | 32.0 | 31.0 | 32.3 |
| Viscosity (mPa · s/25° C.) | 1,700 | 1,800 | 1,700 | 1,200 |

TABLE 3

| | Examples | | | |
|---|---|---|---|---|
| | 1 | 2 | 3 | 4 |
| Polyol A1a | 60 | 60 | 60 | 60 |
| Polyol A2a | 40 | 40 | 40 | 40 |
| Crosslinking agent d1 | 0.5 | 0.5 | 0.5 | 0.5 |
| Crosslinking agent d2 | 3.0 | 3.0 | 3.0 | 3.0 |
| Catalyst e1 | 0.45 | 0.45 | 0.45 | 0.45 |
| Catalyst e2 | 0.07 | 0.07 | 0.07 | 0.07 |
| Silicone foam stabilizer f1 | 0.4 | 0.4 | 0.4 | 0.4 |
| Silicone foam stabilizer f2 | 0.4 | 0.4 | 0.4 | 0.4 |
| Silicon-containing polymer-dispersed polyol g1 | 0.1 | | | |
| Silicon-containing polymer-dispersed polyol g2 | | 0.01 | | |
| Silicon-containing polymer-dispersed polyol g3 | | | 0.1 | |
| Silicon-containing polymer-dispersed polyol g4 | | | | 0.01 |
| Blowing agent h | 3.0 | 3.0 | 3.0 | 3.0 |
| Polyisocyanate compound j (index) | 105 | 105 | 105 | 105 |
| Total density | 49.4 | 49.5 | 49.2 | 49.6 |
| Core density | 44.9 | 45.0 | 44.8 | 45.9 |
| 25% hardness (ILD) | 244 | 258 | 230 | 231 |
| Core rebound resilience | 60 | 66 | 65 | 65 |
| Tear strength | 5.7 | 6.6 | 6.5 | 6.0 |
| Tensile strength | 101 | 118 | 115 | 110 |
| Elongation | 82 | 95 | 90 | 85 |
| Dry set | 3.7 | 3.9 | 3.6 | 3.9 |
| Wet set | 13.6 | 13.4 | 14.1 | 13.9 |
| Hysteresis loss | 21.4 | 20.1 | 21.4 | 20.2 |
| Deflection on 500 N pressure side | 32.8 | 29.1 | 34.4 | 32.8 |
| Deflection difference on pressure side as between 900 N and 500 N | 25.3 | 26.7 | 23.3 | 23.1 |
| Value y in the formula (6) | 22.4 | 23.0 | 21.7 | 21.8 |
| Resonance frequency | 3.45 | 3.30 | 3.43 | 3.48 |
| Transmissibility at resonance frequency | 2.58 | 4.60 | 3.58 | 3.68 |
| Transmissibility at 6 Hz | 0.75 | 0.58 | 0.63 | 0.63 |

TABLE 4

| | Examples | |
|---|---|---|
| | 5 | 6 |
| Polyol A1c | 60 | 60 |
| Polyol A2a | 40 | 40 |
| Crosslinking agent d1 | 0.5 | 0.5 |
| Crosslinking agent d2 | 3.0 | 3.0 |

TABLE 4-continued

|  | Examples | |
| --- | --- | --- |
|  | 5 | 6 |
| Catalyst e1 | 0.45 | 0.45 |
| Catalyst e2 | 0.07 | 0.07 |
| Silicone foam stabilizer f3 | 0.4 | 0.4 |
| Silicone foam stabilizer f2 | 0.4 | 0.4 |
| Silicon-containing polymer-dispersed polyol g1 |  |  |
| Silicon-containing polymer-dispersed polyol g2 | 0.01 |  |
| Silicon-containing polymer-dispersed polyol g3 |  | 0.1 |
| Silicon-containing polymer-dispersed polyol g4 |  |  |
| Blowing agent h | 3.0 | 3.0 |
| Polyisocyanate compound j (index) | 105 | 105 |
| Total density | 49.9 | 49.7 |
| Core density | 46.9 | 46.5 |
| 25% hardness (ILD) | 258 | 246 |
| Core rebound resilience | 65 | 64 |
| Tear strength | 4.8 | 4.5 |
| Tensile strength | 94 | 84 |
| Elongation | 87 | 83 |
| Dry set | 3.8 | 3.9 |
| Wet set | 13.8 | 13.3 |
| Hysteresis loss | 18.7 | 18.3 |
| Deflection on 500 N pressure side | 31.1 | 32.6 |
| Deflection difference on pressure side as between 900 N and 500 N | 25.4 | 24.0 |
| Value y in the formula (6) | 23.0 | 22.5 |
| Resonance frequency | 3.33 | 3.38 |
| Transmissibility at resonance frequency | 3.13 | 2.53 |
| Transmissibility at 6 Hz | 0.68 | 0.68 |

TABLE 6

|  | Examples 7 |
| --- | --- |
| Polyol A1a | 60 |
| Polyol A2a | 40 |
| Crosslinking agent d1 | 0.5 |
| Crosslinking agent d2 | 3.0 |
| Catalyst e1 | 0.45 |
| Catalyst e2 | 0.07 |
| Silicone foam stabilizer f1 | 0.4 |
| Silicone foam stabilizer f2 | 0.4 |
| Silicon-containing polymer-dispersed polyol g1 |  |
| Silicon-containing polymer-dispersed polyol g2 |  |
| Silicon-containing polymer-dispersed polyol g3 |  |
| Silicon-containing polymer-dispersed polyol g4 | 3.0 |
| Blowing agent h | 3.0 |
| Polyisocyanate compound j (index) | 105 |
| Total density | 48.9 |
| Core density | 44.4 |
| 25% hardness (ILD) | 191 |
| Core rebound resilience | 67 |
| Tear strength | 7.2 |
| Tensile strength | 139 |
| Elongation | 103 |
| Dry set | 4.8 |
| Wet set | 17.5 |
| Hysteresis loss | 20.3 |
| Deflection on 500 N pressure side | 41.2 |

TABLE 6-continued

|  | Examples 7 |
| --- | --- |
| Deflection difference on pressure side as between 900 N and 500 N | 17.8 |
| Value y in the formula (6) | 19.0 |
| Resonance frequency | 3.60 |
| Transmissibility at resonance frequency | 4.65 |
| Transmissibility at 6 Hz | 0.73 |

As shown in Tables 3 to 5, the flexible urethane foam of the present invention employs a certain specific silicon-containing polymer-dispersed polyol, whereby it is possible to obtain a foam with little bottom-hitting feeling, as the deflection difference on pressure side as between 900 N and 500 N, of a foam obtained by foaming into a thickness of 100 mm, is large. Each of the contents shown in these Examples is excellent in vibration characteristics, particularly in transmissibility at resonance frequency and transmissibility at 6 Hz, and thus provides good riding comfort.

INDUSTRIAL APPLICABILITY

The flexible polyurethane foam of the present invention is useful for a cushion, a seat, etc. It is particularly suitable for a seat for a vehicle and is especially suitable for a seat for an automobile.

The entire disclosure of Japanese Patent Application No. 2005-153103 filed on May 25, 2005 including specification, claims and summary is incorporated herein by reference in its entirety.

What is claimed is:

1. A flexible polyurethane foam obtained by reacting a polyol composition with a polyisocyanate compound in the presence of a catalyst, a blowing agent and a foam stabilizer, wherein the polyol composition comprises a high molecular weight polyoxyalkylene polyol (A1), and a polymer-dispersed polyol (A2) containing fine polymer particles in the high molecular weight polyoxyalkylene polyol (A1), and at least part of the fine polymer particles contained in the polymer-dispersed polyol (A2) are fine polymer particles having silicon atoms, and wherein with respect to a flexible polyurethane foam obtained by foaming into a thickness of 100 mm, X (N/314 cm$^2$), which is the 25% hardness (ILD) measured in accordance with JIS K6400 (1997) and Y (mm), which is the value (difference in deflection on pressure side) obtained by subtracting the deflection on 500 N pressure side from the deflection on 900 N pressure side obtained from a load-deflection curve as measured by a pressure plate (Tekken Plate) in accordance with JIS E7104 (2002), satisfy a relation formula represented by the following formula (5):

$$Y \geq -0.000370842 X^2 + 0.225401 X - 10.5013 \quad (5),$$

wherein the fine polymer particles having silicon atoms are fine polymer particles obtained by polymerizing a monomer comprising a silicon-containing acrylate or a silicon-containing methacrylate.

2. The flexible polyurethane foam according to claim 1, wherein the silicon-containing acrylate or the silicon-containing methacrylate is represented by the following formula (1), (2) or (3):

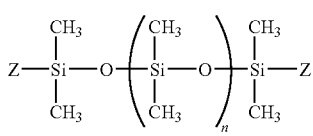
formula (1)

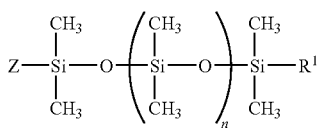
formula (2)

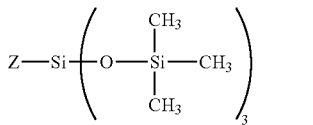
formula (3)

provided that $R^1$ in the formula (2) is a $C_{1-20}$ alkyl group, "n" in the formulae (1) and (2) is an integer of from 1 to 1,000, and Z in the formulae (1) to (3) is an organic group represented by the formula (4):

 formula (4)

wherein $R^2$ is a $C_{1-20}$ alkylene group, and $R^3$ is a hydrogen atom or a methyl group.

3. The flexible polyurethane foam according to claim 1, which has a core density of from 30 to 70 kg/m³.

4. The flexible polyurethane foam according to claim 3, which has a core density of from 35 to 60 kg/m³.

5. The flexible polyurethane foam according to claim 1, wherein with respect to a flexible polyurethane foam obtained by foaming into a thickness of 100 mm, when the deflection on 500 N pressure side obtained from a load-deflection curve as measured by a pressure plate (Tekken Plate) in accordance with JIS E7104 (2002), is from 5.0 to 55.0 mm, Y (mm), which is the value (the difference in deflection on pressure side) obtained by subtracting the deflection on 500 N pressure side from the deflection on 900 N pressure side, is from 22.5 to 33.0 mm.

6. The flexible polyurethane foam according to claim 1, wherein with respect to a foam obtained by foaming into a thickness of 100 mm, when the deflection on 500 N pressure side obtained from a load-deflection curve as measured by a pressure plate (Tekken Plate) in accordance with JIS E7104 (2002), is from 18.0 to 55.0 mm, Y (mm), which is the value (the difference in deflection on pressure side) obtained by subtracting the deflection on 500 N pressure side from the deflection on 900 N pressure side, is from 22.5 to 33.0 mm.

7. A seat for an automobile, which is made of the flexible polyurethane foam as defined in claim 1.

8. A process for producing a flexible polyurethane foam, which comprises reacting a polyol composition with a polyisocyanate compound in the presence of a catalyst, a blowing agent and a foam stabilizer, wherein the polyol composition comprises a high molecular weight polyoxyalkylene polyol (A1) and a polymer-dispersed polyol (A2) containing fine polymer particles in the high molecular weight polyoxyalkylene polyol (A1), and at least part of the fine polymer particles contained in the polymer-dispersed polyol (A2) are fine polymer particles having silicon atoms, and wherein with respect to a flexible polyurethane foam obtained by foaming into a thickness of 100 mm, X (N/314 cm²), which is the 25% hardness (ILD) measured in accordance with JIS K6400 (1997) and Y (mm), which is the value (difference in deflection on pressure side) obtained by subtracting the deflection on 500 N pressure side from the deflection on 900 N pressure side obtained from a load-deflection curve as measured by a pressure plate (Tekken Plate) in accordance with JIS E7104 (2002), satisfy a relation formula represented by the following formula (5):

$$Y \geq -0.000370842X^2 + 0.225401X - 10.5013 \quad (5),$$

wherein the fine polymer particles having silicon atoms are fine polymer particles obtained by polymerizing a monomer comprising a silicon-containing acrylate or a silicon-containing methacrylate.

9. The process for producing a flexible polyurethane foam according to claim 8, wherein the silicon-containing acrylate or the silicon-containing methacrylate is represented by the following formula (1), (2) or (3):

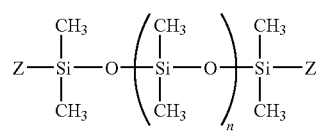
formula (1)

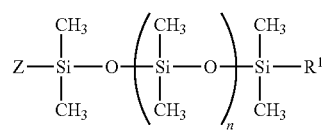
formula (2)

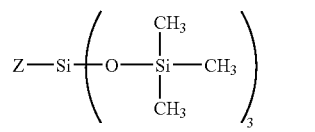
formula (3)

provided that $R^1$ in the formula (2) is a $C_{1-20}$ alkyl group, "n" in the formulae (1) and (2) is an integer of from 1 to 1,000, and Z in the formulae (1) to (3) is an organic group represented by the formula (4):

 formula (4)

wherein $R^2$ is a $C_{1-20}$ alkylene group, and $R^3$ is a hydrogen atom or a methyl group.

10. The process for producing a flexible polyurethane foam according to claim 9, wherein at least one member selected from the group consisting of water and an inert gas is used as the blowing agent.

11. The flexible polyurethane foam according to claim 2, wherein the silicon-containing acrylate or silicon-containing methacrylate is represented by formula (1).

12. The flexible polyurethane foam according to claim 2, wherein the silicon-containing acrylate or silicon-containing methacrylate is represented by formula (2).

13. The flexible polyurethane foam according to claim 2, wherein the silicon-containing acrylate or silicon-containing methacrylate is represented by formula (3).

14. The flexible polyurethane foam according to claim 1, wherein the polyoxyalkylene polyol has oxyethylene groups at its terminals.

15. The flexible polyurethane foam according to claim 1, wherein the fine polymer particles are present in an amount of from 1 to 50 mass % of the amount of polymer-dispersed polyol.

16. The flexible polyurethane foam according to claim 15, wherein the fine polymer particles are present in an amount of from 0.1 to 50 mass % based on 100 mass % of the polyol composition.

17. The flexible polyurethane foam according to claim 1, wherein at least part of the fine polymer particles contained in the polymer-dispersed polyol (A2) are fine polymer particles having no silicon atoms, and wherein the ratio of fine polymer particles obtained by polymerizing a monomer containing a silicon-containing (meth)acrylate in the entire fine polymer particles in the polymer-dispersed polyol (A2) is from 0.0001 to 30 mass %.

18. A flexible polyurethane foam obtained by reacting a polyol composition with a polyisocyanate compound in the presence of a catalyst, a blowing agent and a foam stabilizer, wherein the polyol composition comprises a high molecular weight polyoxyalkylene polyol (A1), and a polymer-dispersed polyol (A2) containing fine polymer particles in the high molecular weight polyoxyalkylene polyol (A1), and at least part of the fine polymer particles contained in the polymer-dispersed polyol (A2) are fine polymer particles having silicon atoms, and wherein with respect to a flexible polyurethane foam obtained by foaming into a thickness of 100 mm, when the deflection on 500 N pressure side obtained from a load-deflection curve as measured by a pressure plate (Tekken Plate) in accordance with JIS E7104 (2002), is from 5.0 to 55.0 mm, Y (mm), which is the value (the difference in deflection on pressure side) obtained by subtracting the deflection on 500 N pressure side from the deflection on 900 N pressure side, is from 22.5 to 33.0 mm, wherein the fine polymer particles having silicon atoms are fine polymer particles obtained by polymerizing a monomer comprising a silicon-containing acrylate or a silicon-containing methacrylate.

* * * * *